United States Patent
Yang et al.

(10) Patent No.: US 9,558,299 B2
(45) Date of Patent: Jan. 31, 2017

(54) SUBMATCH EXTRACTION

(75) Inventors: Liu Yang, Piscataway, NJ (US); Prasad V. Rao, Metuchen, NJ (US); Pratyusa Kumar Manadhata, Piscataway, NJ (US); William G. Horne, Lawrenceville, NJ (US); Stuart Haber, New York, NY (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1093 days.

(21) Appl. No.: 13/460,419

(22) Filed: Apr. 30, 2012

(65) Prior Publication Data

US 2013/0290356 A1   Oct. 31, 2013

(51) Int. Cl.
*G06F 17/30* (2006.01)
*G06F 7/00* (2006.01)

(52) U.S. Cl.
CPC .............................. *G06F 17/30985* (2013.01)

(58) Field of Classification Search
None
See application file for complete search history.

(56) References Cited

U.S. PATENT DOCUMENTS

| | | | |
|---|---|---|---|
| 5,680,332 A | 10/1997 | Raimi et al. | |
| 6,185,524 B1 | 2/2001 | Carus et al. | |
| 6,292,772 B1 | 9/2001 | Kantrowitz | |
| 6,626,960 B1 | 9/2003 | Gillam | |
| 8,032,479 B2 | 10/2011 | Kori | |
| 8,051,085 B1 * | 11/2011 | Srinivasan | 707/737 |
| 2004/0193399 A1 | 9/2004 | Potter et al. | |
| 2006/0085389 A1 | 4/2006 | Flanagan et al. | |
| 2008/0140991 A1 * | 6/2008 | Pandya | 712/37 |
| 2009/0228474 A1 | 9/2009 | Chiu et al. | |
| 2010/0017850 A1 | 1/2010 | More et al. | |
| 2011/0258210 A1 | 10/2011 | Agarwal et al. | |
| 2011/0295779 A1 | 12/2011 | Chen et al. | |

OTHER PUBLICATIONS

Yang et al. "Improving NFA-based Signature Matching using Ordered Binary Decision Diagrams," Sep. 15-17, 2010.*
Chapple "Should IDS and SIM/SEM/SIEM be used for network intrusion monitoring?" Aug. 10, 2011.*
Ehrenberg, Useless Factor, May 10, 2008.*
Laurikari, Efficient submatch addressing for regular expressions, Nov. 1, 2001.*
Becchi, Michela et al., Extending Finite Automata to Efficiently Match Perl-compatible Regular Expressions, Washington University, Dec. 9, 2008, < http://www.cs.wustl.edu/~pcrowley/a25-becchi.pdf >.
Cox, Russ, "Regular Expression Matching Can Be Simple and Fast (but is slow in Java, Perl, PHP, Python, Ruby, . . . )" Jan. 2007. <http://swtch.com/~rsc/regexp/regexp1.html>.

(Continued)

*Primary Examiner* — Usmaan Saeed
*Assistant Examiner* — Yu Zhao
(74) *Attorney, Agent, or Firm* — Mannava & Kang, P.C.

(57) ABSTRACT

A method for submatch extraction may include receiving an input string, receiving a regular expression. The method may further include converting the regular expression with capturing groups into ordered binary decision diagrams (OBDDs) to extract submatches.

14 Claims, 8 Drawing Sheets

(56) References Cited

OTHER PUBLICATIONS

Cox, Russ, "Regular Expression Matching with a Trigram Index", Jan. 2012. <http://swtch.com/~rsc/regexp/regexp4.html>.
Cox, Russ, "Regular Expression Matching: the Virtual Machine Approach", Dec. 2009. <http://swtch.com/~rsc/regexp/regexp2.html>.
Cox, Russ, "Regular Expressions Matching in the Wild", Mar. 2010. <http://swtch.com/~rsc/regexp/regexp3.html>.
Davis, Mark, Text Boundaries, Mar. 25, 2005. < http://unicode.org/reports/tr29/tr29-9.html >.
Fowler, Glenn, "An Interpretation of the POSIX regex Standard", Jan. 2003. <http://www2.research.att.com/~gsf/testregex/re-interpretation.html>.
Hazel, P. "PCRE—Perl Compatible Regular Expressions" Last Modified: Mar. 1, 2012. <http://www.pere.org/>.
Hopcroft, John, E., et al., Introduction to automata theory, languages, and computation, 2nd edition, published Addison-Wesley, 2001.
Kearns, Steven Michael, "Extending Regular Expressions", Columbia University, 1990.
Rabin, M.O., et al., "Finite Automata and Their Decision Problems", IBM Journal, Apr. 1959.
McNaughton, R., et al. "Regular Expressions and State Graphs for Automata", IRE Transactions on Eletrical Computers, 1960.
Nourie, Dana, et al., "Regular Expressions and the Java Programming Language", Aug. 2001, Updated Apr. 2002. <http://java.sun.com/developer/technicalArticles/releases/1.4regex>.
"Perl regular expression inconsistency", PerlMonks, Download Date: Mar. 13, 2013. <www.perlmonks.org/?node id=536515>.
"Regex Posix", Haskell Wiki, Download Date: May 15, 2013. <http://www.haskell.org/haskellwiki/Regex_Posix>.
"Regular Expressions", The Open Group Base Specification Issue 6, IEEE Std 1003.1, 2004. <http://pubs.opengroup.org/onlinepubs/009695399/basedefs/xbdchap09.html>.
"SIEM Solution for Enterprise Security Management", ArcSight: Arcsight ESM, Download Date: Apr. 3, 2013. <http://www.arcsight.com/products/products-esm/>.
Turn Machine Data into Real-time Visibility, Insight and Intelligence: Powerful search, analysis and visualizations. Thousands of enterprise customers. Quick to get started., Download Date: Apr. 3, 2013., <www.splunk.com/product>.
Brelaz, Daniel, "New Methods to Color the Vertices of a Graph", Communications of th Association of Computing Machinery 22, 251-256. Apr. 1979, vol. 22.
Clojure, Download Date: Mar. 13, 2013. <http://www.clojure.org>.
Cox, R., "An efficient, principled regular expression library", Google Project Hosting; Download Date: Apr. 3, 2013. <https://code.google.com/p/re2/>.
Hutchings, B. L., et al., "Assisting Network Intrusion Detection with Reconfigurable Hardware", Department of Electrical and Computer Engineering, Brigham Young Univ., pp. 111-120, 2002.
Kumar, Sailesh, et al., "Algorithms to Accelerate Multiple Regular Expressions Matching for Deep Packet Inspection", In: ACM SIGCOMM Conf. pp. 339-350, 2006.
LogLogic: Loglogic products index. Download Date: Apr. 3, 2013,<http://www.loglogic.com/products/overview>.
Nicolett, Mark, et al., "Magic Quadrant for Security Information and Event Management (SIEM)", May 12, 2011. <http://www.gartner.com/DisplayDocument?doc\_cd=212454>.
Xeger: A Java library for generating random text from regular expressions, Download Date: Mar. 13, 2013.<http://code.google.com/p/xeger/wiki/XegerLimitations>.
Yang, Liu, et al., "Fast Submatch Extraction using OBDDs", Proceedings of 8th ACM/IEEE Symposium on Architectures for Networking and Communications Systems (ANCS'12), Oct. 29-30, 2012, Austin TX, USA.<http://pages.cs.wisc.edu/~vg/papers/ancs2012/ancs2012.pdf>.
Brodie, B.C., Taylor, D.E., Cytron, R.K.: A scalable architecture for high- throughput regular-expression pattern matching. In: Intl. Symp. Computer Ar-chitecture. pp. 191{202. IEEE Computer Society (2006).
Sommer, R., et al., Enhancing byte-level network intrusion detection signatures with context. In: Conference on Computer and Comm. Security, ACM, 2003 pp. 262-271.
Thompson, Ken, Programming techniques: Regular expression search algorithm, Commun. ACM 11, Jun. 1968, pp. 419-422.
Yang, L., Karim, et al., Improving nfa-based signature matching using ordered binary decision diagrams, In: RAID'10: Proceedings of the 13th International Symposium on Recent Advances in Intrusion Detection, vol. 6307 of Lecture Notes in Computer Science (LNCS)., Ottawa, Canada, Springer pp. 58-78, Sep. 2010.
Yang, Liu, et al., Fast, memory-efficient regular expression matching with NFA-OBDDs, Computer Networks 55(15), Oct. 2011, pp. 3376-3393.
Yu, Fang, et al., Fast and memory-efficient regular expression matching for deep packet inspection, ACM/IEEE Symp. on Arch. for Networking and Comm. Systems, 2006, pp. 93-102.
Pike, R.: The text editor sam. Softw. Pract. Exper. 17, Nov. 1987, pp. 813-845.
Bruggemann-Klein, Anne, et al., "One-Unambiguous Regular Languages", Information and Computation 142, 182-206 (1998).
Hooimeijer, Pieter, et al., "An Evaluation of Automata Alogorithms for String Analysis", Microsoft Research Technical Report MSR-TR-2010-90, Jul. 2010.
Jurafsky, Daniel, et al., "Chapter 2, Regular Expressions and Automata", Speech and Language Processing: An Introduction to natural language processing, computational linguistics, and speech recognition, 2007.
Benjamin, Brodie, et al., A Scalable Architecture for High-Throughput Regular-Expression Pattern Matching, Intl. Symp. Computer Architecture, IEEE Computer Society, 2006, pp. 191-202.
Clark, Christopher R., et al., Scalable Pattern Matching for High Speed Networksl, IEEE Symp. on Field-Programmable Custom Computing Machines, IEEE Computer Society, 2004, pp. 249-257.
Cox, R. Implementing regular expressions, Aug. 2011 <http://swtch.com/rsc/regexp/>.
Laurikari, V., Nfas with tagged transitions, their conversion to deterministic automata and application to regular expressions, In: Proceedings of the Symposium on String Processing and Information Retrieval, Sep. 2000.
Laurikari, Ville, Efficient submatch addressing for regular expressions, Helsinki University of Technology, Nov. 1, 2001.
Meiners, Chad R., et al., Fast Regular Expression Matching using Small TCAMs for Network Intrusion Detection and Prevention Systems, 19th USENIX Security Symposium, Aug. 2010.
Sidhu, Reetinder, et al., Fast Regular Expression Matching using FPGAs, Symp. on Field Programmable Custom Computing Machines, IEEE Computer Society, 2001, pp. 227-238.
Smith, R., et al., Deflating the Big Bang: Fast and scalable deep packet inspection with extended finite automata, SIGCOMM Conference, ACM, 2008, pp. 207-218.
Smith, R., et al., XFA: Faster signature matching with extended automata. In: Symp. on Security and Privacy, IEEE Computer Society, 2008, pp. 187-201.
Smith, Randy, et al., Backtracking Algorithmic Complexity Attacks Against a NIDS, Annual Computer Security Applications Conf., IEEE Computer Society, 2006, pp. 89-98.

* cited by examiner

| Current state ($x$) | Input symbol ($i$) | Next state ($y$) | Output tags ($t$) |
|---|---|---|---|
| 1 | a | 1 | $\{t_1\}$ |
| 1 | a | 2 | $\phi$ |
| 2 | a | 3 | $\phi$ | backward path   1 <- 1 <- 1 <- 2 <- 3
input symbol        a   a   a   a
output tag          $t_1$ $t_1$ null null

Fig. 6

| $x$ | $i$ | $y$ | $t$ | $\Delta(x,i,y,t)$ |
|-----|-----|-----|-----|-------------------|
| 0   | 1   | 0   | 1   | 1                 |
| 0   | 1   | 1   | 0   | 1                 |
| 1   | 0   | 1   | 0   | 1                 |

Fig. 7

SUBMATCH EXTRACTION

BACKGROUND

Regular expressions provide a concise and formal way of describing a set of strings over an alphabet. Given a regular expression and a string, the regular expression matches the string if the string belongs to the set described by the regular expression. Regular expression matching may be used, for example, by command shells, programming languages, text editors, and search engines to search for text within a document. Known techniques for regular expression matching can have long worst-case matching times.

BRIEF DESCRIPTION OF DRAWINGS

Features of the present disclosure are illustrated by way of example and not limited in the following figure(s), in which like numerals indicate like elements, in which:

FIG. 6 illustrates how first two symbols are associated with submatch tag $t_1$, and all other symbols have no output tag, according to an example of the present disclosure;

FIG. 7 illustrates a Boolean function representation of the transition table of FIG. 5B, according to an example of the present disclosure;

DETAILED DESCRIPTION

Figure 1:
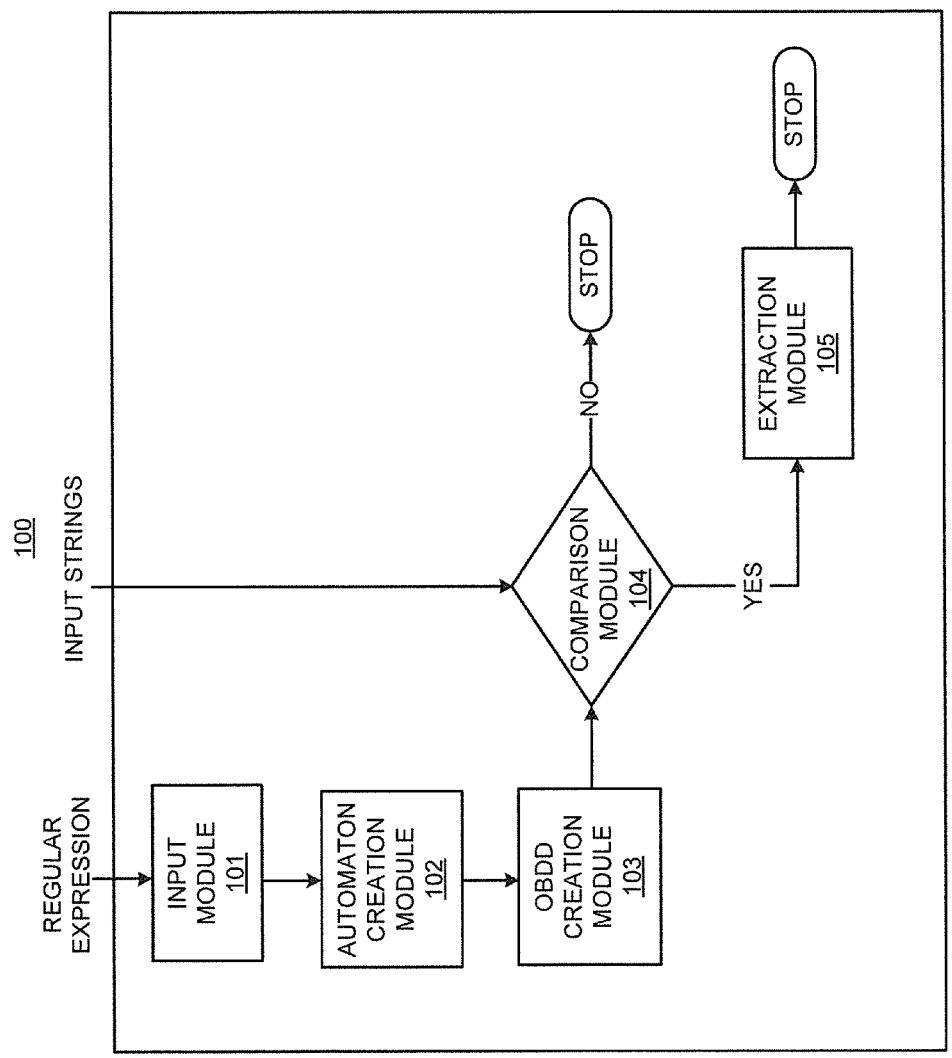
FIG. 1 illustrates an architecture of a submatch extraction system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Regular expressions are a formal way to describe a set of strings over an alphabet. Regular expression matching is the process of determining whether a given string (for example, a string of text in a document) matches a given regular expression. That is, whether the given string is in the set of strings that the regular expression describes. Given a string that matches a regular expression (or a regular expression that matches a string), submatch extraction is a process of extracting substrings corresponding to specified subexpressions known as capturing groups. This feature provides for regular expressions to be used as parsers, where the submatches correspond to parsed substrings of interest. For example, the regular expression (.*)=(.*) may be used to parse key-value pairs, where the parentheses are used to indicate the capturing groups.

A submatch extraction system and method for extracting submatches from a string that matches a regular expression are described herein. As described in detail below, the system and method use Boolean functions to represent transitions of non-deterministic finite automata (NFAs), and manipulate the Boolean functions using ordered binary decision diagrams (OBDDs). An automaton is defined as an abstract machine that can be in one of a finite number of states and includes rules for traversing the states. As described in further detail below, an OBDD is defined as a data structure that is used to represent a Boolean function. The automaton and the OBDD may be stored in the submatch extraction system as machine readable instructions, or as data other than instructions. The system and method use a two-pass technique. A forward pass scans an input string and decides whether it is accepted by an automaton. If so, a backward pass is used to extract submatches described by the capturing groups of a regular expression. In this manner, the regular expression may be compiled by an automaton creation module (described below), and then matched to many different input strings to extract submatches. The implementation of the submatch extraction system and method provide both time and space efficiency. The system and method provide reduced submatch extraction times in the worst case.

In an example, the submatch extraction system generally includes a memory storing a module comprising machine readable instructions to receive an input string, receive a regular expression, and convert the regular expression with capturing groups into OBDDs to extract submatches. The system may include a processor to implement the module.

In an example, the method for submatch extraction includes receiving an input string, receiving a regular expression, and converting the regular expression with capturing groups into OBDDs to extract submatches.

In an example, a non-transitory computer readable medium having stored thereon machine readable instructions for submatch extraction is also described. The machine readable instructions when executed may cause a computer system to receive an input string, receive a regular expression, and convert the regular expression with capturing groups into OBDDs to extract submatches.

Figure 2:
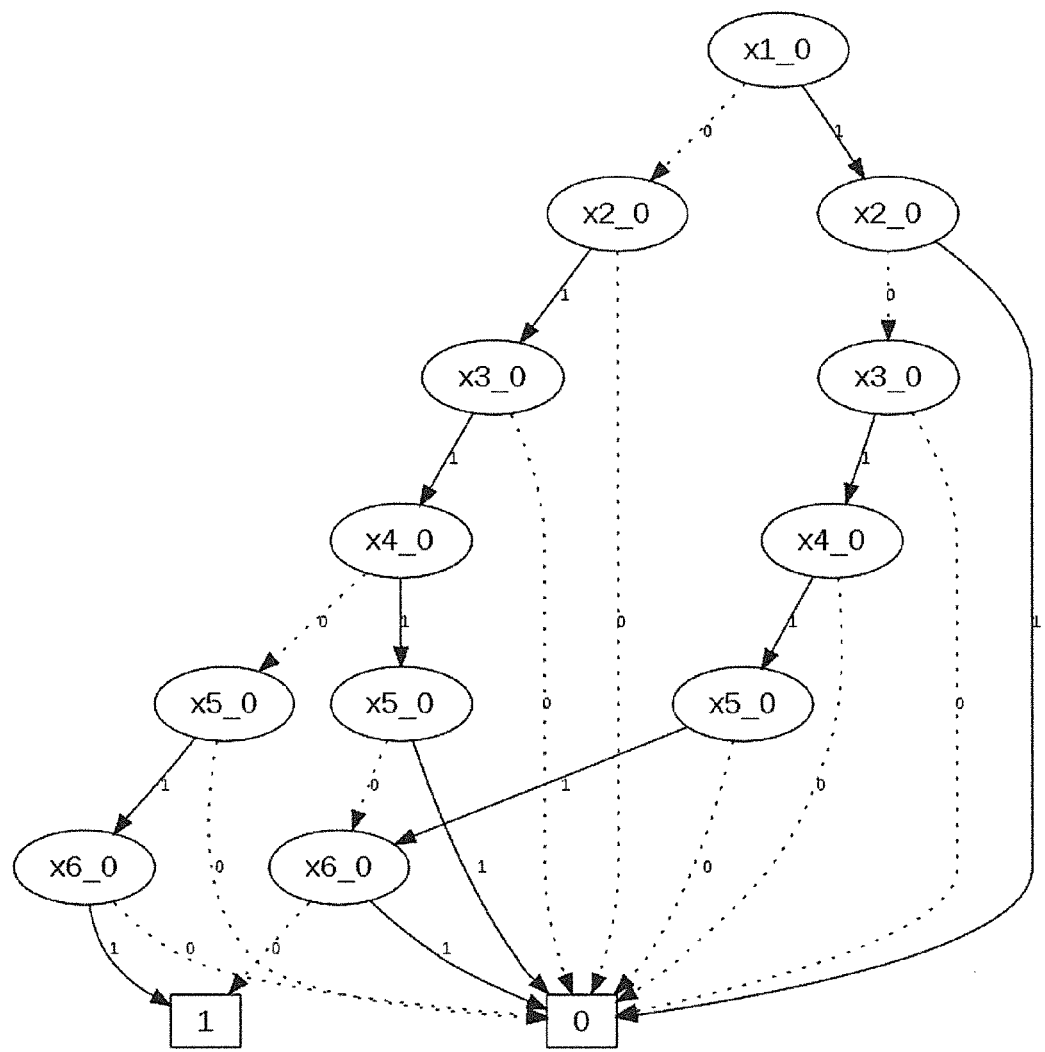
FIG. 2 illustrates an example of an ordered binary decision diagram (OBDD) for the Boolean function $f(x, i, y, t)$ shown in FIG. 7 with the variable ordering $x<i<y<t$, according to an example of the present disclosure.

As discussed above, an OBDD is a data structure that may be used to represent a Boolean function and can be considered as a compressed representation of sets or relations. OBDDs can be used to transform Boolean function manipulations into efficient graph representations. An OBDD represents a Boolean function $f(x_1, x_2, \ldots, x_n)$ as a rooted, directed acyclic graph (DAG). The DAG includes two terminal nodes, which are labeled 0 and 1, and have no outgoing edges. Each remaining non-terminal node is associated with a label from the set $\{x_1, x_2, \ldots, x_n\}$, and includes two outgoing edges labeled 0 and 1. An OBDD may be ordered such that node labels are associated with a total order <. Node labels along all paths in the OBDD from the root to the terminal nodes follow this total order. Evaluation of a Boolean function denoted by an OBDD may be performed by traversing appropriately labeled edges from the root to the terminal nodes of the DAG. For example, FIG. 2 illustrates an example of an OBDD for the Boolean function $f(x_1, x_2, x_3, x_4, x_5, x_6) = (\bar{x}_1 \wedge x_2 \wedge x_3 \wedge \bar{x}_4 \wedge x_5 \wedge x_6) \vee (\bar{x}_1 \wedge x_2 \wedge x_3 \wedge x_4 \wedge \bar{x}_5 \wedge \bar{x}_6) \vee (x_1 \wedge \bar{x}_2 \wedge x_3 \wedge x_4 \wedge x_5 \wedge \bar{x}_6)$ with the variable ordering of $x_1 < x_2 < x_3 < x_4 < x_5 < x_6$.

OBDDs provide for efficient manipulation of Boolean functions. With OBDDs, checking whether a Boolean function is satisfactory or unsatisfactory is a constant time operation. This is because it is sufficient to check whether the terminal node labeled 1 (or 0) is present in the OBDD. With regard to OBDDs, APPLY and RESTRICT operations allow OBDDs to be combined and modified with a number of Boolean operators.

The APPLY operation allows binary Boolean operators, such as AND ($\wedge$) and OR ($\vee$), to be applied to a pair of OBDDs. Two input OBDDs, OBDD($f$) and OBDD($g$), have the same variable ordering. APPLY (OP, OBDD($f$), OBDD ($g$)) computes OBDD($f$ OP $g$), which has the same variable ordering as the input OBDDs.

The RESTRICT operation is unary, and produces as output an OBDD in which the values of some of the variables of the input OBDD have been fixed to a certain value. That is, RESTRICT (OBDD($f$), x←k)= OBDD(f|$_{(x \leftarrow k)}$), where $f|_{(x \leftarrow k)}$ denotes that x is assigned the value k in $f$. In this case, the output OBDD does not have any nodes with the label x.

The APPLY and RESTRICT operations are implemented as a series of graph transformations and reductions to the input OBDDs, and include efficient implementations. For example, the time complexity of the APPLY and RESTRICT operations is polynomial in the size of the input OBDDs.

The APPLY and RESTRICT operations may be used to implement existential quantification, which is used in the operation of the submatch extraction system and method. In particular, $\exists x_i.f(x_1, \ldots, x_n) = f(x_1, \ldots, x_n)|_{(xi \leftarrow 0)} \vee f(x_1, \ldots, x_n)|_{(xi \leftarrow 1)}$. Expressed by OBDD, this results in OBDD($\exists x_i.f(x_1, \ldots, x_n)$)=APPLY ($\vee$, RESTRICT (OBDD ($f$), $x_i$←1), RESTRICT(OBDD($f$), $x_i$←0)). Further, OBDD ($\exists x_i.f(x_1, \ldots, x_n)$) will have no node labeled $x_i$.

OBDDs may be used to obtain concise representations of relations over finite domains. For example, if R is an n-ary relation over the domain {0, 1}, then its characteristic function $f_R$ may be defined as follows: $f_R(x_1, \ldots, x_n)$=1 if and only if $R(x_1, \ldots, x_n)$. For example, the characteristic function of the 3-ary relation R={(1, 0, 1), (1, 1, 0)} is $f_R(x_1, x_2, x_3) = (x_1 \wedge \bar{x}_2 \wedge x_3) \vee (x_1 \wedge x_2 \wedge \bar{x}_3)$, which is a Boolean function and can therefore be expressed using an OBDD.

A set of elements over an arbitrary domain D can also be expressed as an OBDD. If S is a set of elements over a domain D, then a relation $R_S$ may be defined such that $R_S(s)$=1 if and only if s∈S. Operations on sets may then be expressed as Boolean operations and performed on the OBDDs representing these sets. For example, isEmpty(S∩T) is equivalent to checking the satisfiability of OBDD(APPLY($\wedge$S,T)). As described below, the conversion of relations and sets into OBDDs may be used in the construction and operation of the submatch extraction system and method.

By using OBDDs for submatch extraction, the time efficiency of submatch extraction is increased. Using OBDDs for submatch extraction also provides for retention of space-efficiency. Further, using OBDDs provides for handling of all classes of regular expressions. The system and method described herein also provide for submatch extraction for complex regular expressions and for submatch extraction on a set of regular expressions combined together.

With regard to parsing, parsing using regular expressions may be used as a building block for security applications such as security information and event management (SIEM) systems. SIEM systems perform real-time analysis of event logs and security alerts generated by hardware and software systems in an enterprise network. Since each source generates its logs in a different format, a SIEM system may use submatch extraction to parse common fields, such as, for example, device name and attack source from the logs. In such a setting, a relatively small number of regular expressions, which are known in advance, may be matched to a large number of input strings in real time. In this regard, the submatch extraction system and method provide for efficient submatch extraction when matching a string to a regular expression, where the expression may be compiled in advance into a form that will facilitate matching and submatching. The submatch extraction system and method may therefore be implemented, for example, in a parser, in a SIEM system, and in an intrusion detection system (IDS).

FIG. 1 illustrates an architecture of a submatch extraction system 100, according to an example. Referring to FIG. 1, the system 100 may include an input module 101 to receive a regular expression. The regular expression may be used to create an automaton by an automaton creation module 102. An OBDD creation module 103 may construct OBDD representations of the automaton. A comparison module 104 may receive input strings, and match the input strings to the regular expression. If an input string does not match the regular expression, submatches are not extracted. However, if an input string matches the regular expression, the OBDDs created by the OBDD creation module 103 may be used to extract submatches by an extraction module 105. In this manner, the regular expression may be compiled by the modules 102 and 103, and then matched to many different input strings to extract submatches.

The modules 101-105, and other components of the system 100 may comprise machine readable instructions stored on a computer readable medium. In addition, or alternatively, the modules 101-105, and other components of the system 100 may comprise hardware or a combination of machine readable instructions and hardware.

The components of the system 100 are described in further detail with reference to FIGS. 1-7.

Referring to FIG. 1, for the submatch extraction system 100, creation of an automaton by the automaton creation module 102 is described. Generally, as described in further detail below, the automaton creation module 102 may convert the regular expression with capturing groups into an nondeterministic finite automaton (NFA) with ϵ-transitions. ϵ-transitions provide a convenient way of constructing an NFA from a regular expression. An ϵ-transition allows an automaton to transit to a new state without consuming any input symbol. Such an NFA may be denoted as an ϵ-NFA, which may be further converted into an ϵ-free NFA (i.e., a NFA without ϵ-transitions). s-transitions do not add extra capacity of recognizing formal languages. ϵ-NFAs and NFAs recognize the same class of languages, i.e., regular languages.

With regard to regular expressions, the language described by a regular expression may also be defined by a finite automaton. For example, the language described by regular expression a*aa represents strings starting with zero of more a's, and ending with aa. For a regular expression R, the automaton creation module 102 may construct an ϵ-NFA that defines the same language as R. The automaton creation module 102 may further reduce the ϵ-NFA to an ϵ-free NFA. An ϵ-free NFA may be described by a tuple A=(Q, Σ, δ, S, F), where Q is a finite set of states, Σ is a finite set of input symbols, S is a set of start states, F is a set of accept states, and δ is the transition function which takes a state in Q and an input in Σ as arguments and returns the next set of states which is a subset of Q.

For the regular expression R, a capturing group may be a part of a regular expression, called a subexpression, which is wrapped within a pair of parentheses. As discussed above, the capturing group may be used to specify a substring of a string described by a regular expression, with the substring being denoted a submatch. For example, a submatch of string aaab specified by regular expression (a*b*)b* is aaa. A submatch may not be unique for some regular expressions. For example, aaab is another valid submatch of aaab for regular expression (a*b*)b*.

The automaton creation module 102 converts a regular expression with capturing groups to a tagged NFA (note: references to NFA refer to a tagged NFA), which is described by a tuple A=(Q, Σ, T, δ, Γ, S, F), where:

Q is a finite set of states;
Σ is a finite set of input symbols;
δ is the transition function;
S is a set of start states;
F is a set of accept states;
T is a finite set of tags (the tags may be generally defined as symbols specifying each of the subexpressions); and
Γ is a tag output function Γ: Q×E×Q→$2^T$. This function takes a transition (i.e., current state, an input symbol, and a next state) as arguments, and returns a set of tags associated with the input transition.

Figure 3C:
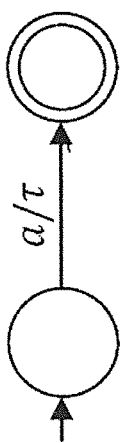
FIGS. 3A-3C illustrate bases of tagged non-deterministic finite automata (NFA) construction from a regular expression, according to an example of the present disclosure.
Figure 3B:
Figure 3A:
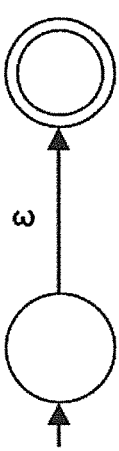
Figure 4A:
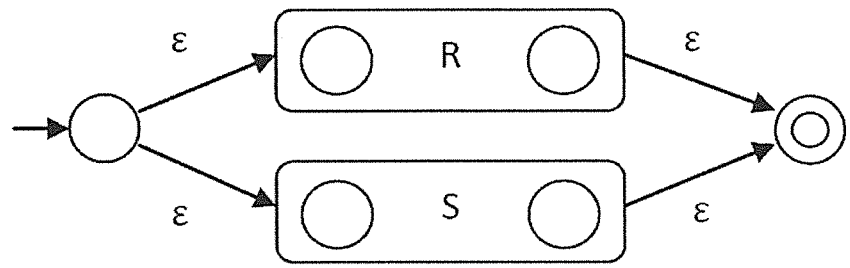
FIGS. 4A-4C respectively illustrate union, concatenation, and closure constructs of tagged NFA construction from a regular expression, according to an example of the present disclosure.
Figure 4B:
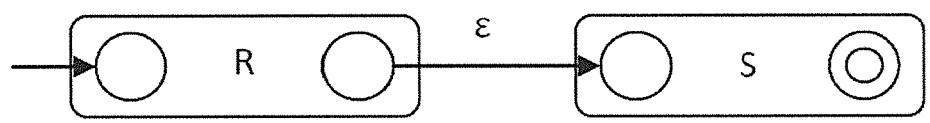
Figure 4C:
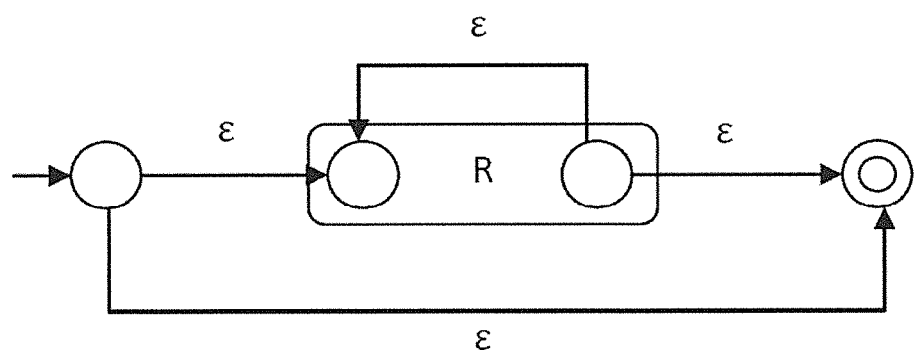

In order to construct the automaton A, the automaton creation module 102 may use an inductive NFA construction approach. Referring to FIGS. 3A-3C, three cases of bases of NFA construction from a regular expression are illustrated. FIG. 3A illustrates the NFA of expression ∈, FIG. 3B illustrates handling of the empty regular expression, and FIG. 3C provides the NFA of a single character a with a set of tags τ∈$2^T$ corresponding to capturing groups associated with the illustrated transition. Union, concatenation, and closure constructs are respectively shown in FIGS. 4A-4C. The automaton creation module 102 uses the basis and inductive constructs shown in FIGS. 3A-3C and 4A-4C to construct the NFA of any regular expression.

The automaton creation module 102 performs ∈-elimination to convert an ∈-NFA to an ∈-free NFA described by a tuple $A_1$=($Q_1$, Σ, T, $δ_1$, $Γ_1$, $S_1$, $F_1$), where:

$Q_1$ is a finite set of states;
Σ is a finite set of input symbols;
$δ_1$ is the transition function; $δ_1$: $Q_1$×Σ→$2^{Q1}$;
$S_1$ is ∈$Q_1$ set of start states;
$F_1$ is ∈$Q_1$ set of accept states;
T is a finite set of tags;
$Γ_1$ is a tag output function $Γ_1$: $Q_1$×Σ×$Q_1$→$2^T$.

$Q_1$ includes final states in A and any state that has an outgoing transition for a symbol in Σ. Transition function $δ_1$ and tag output function $Γ_1$ may be defined as follows: $δ_1$(q, a)=p and $Γ_1$(q, a, p)=t if and only if there exists a, q, p', and t such that $δ_1$(q, a)=p', $Γ_1$(q, a, p')=t and p ∈∈-closure(p'). The final state $F_1$ is defined by $F_1$={q|∈∈-closure(q); q ∈$Q_1$; f ∈F}, where F is the set of final states of A.

Figures 5A, 5B:
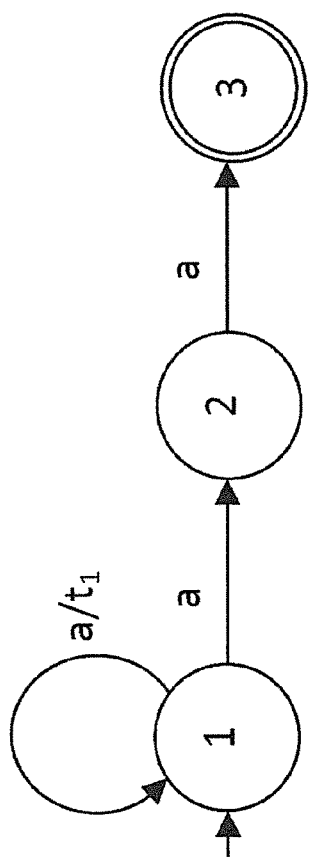
FIG. 5A illustrates an example denoting a tagged NFA of a regular expression (a*)aa, according to an example of the present disclosure.
FIG. 5B illustrates an extended transition table Tr(x; i; y; t) of the tagged NFA constructed from regular expression (a*)aa of FIG. 5A, according to an example of the present disclosure.

The transition function $δ_1$ and the tag output function $Γ_1$ may be represented by an extended transition table Tr= Tr (x, i, y, t), where x denotes a current state, i denotes an input symbol, y denotes a next state for x with input i, and t is a set of output tags associated with transition (x, i, y). Each row of Tr may include a transition along with a set of output tags. FIG. 5A illustrates an example denoting a tagged NFA of a regular expression (a*)aa. FIG. 5B shows an extended transition table of the tagged NFA constructed from the regular expression (a*)aa. Since this regular expression has one capturing group, T={$t_1$}.

In order to determine whether an input string is in a language described by the regular expression, the ∈-free NFA created by the automaton creation module 102 may be used by the comparison module 104 to perform a match test. In order to perform the match test, for a given input string $a_0 a_1 \ldots a_l$ ∈Σ*, the NFA may be in a set of states (called the frontier) at any instant during its operation. For frontier derivation, starting from the start states $S_1$, with the first input symbol $a_0$, the next set of states may be obtained by looking up transitions such that the values of the first two columns satisfy x ∈$S_1$ and i=$a_0$. If these transitions are denoted by $Tr_1$, then $Tr_1$={(x, i, y, t)|x∈$S_1$; i=$a_0$, (x, i, y, t) ∈$T_r$}. The new frontier (i.e., next set of states) $Y_1$ is defined by $Y_1$={y|(x, i, y, t) ∈$Tr_1$}. Renaming $Y_1$ to $X_1$ and using it as a current set of states, with the second input symbol $a_1$, the new frontier of the NFA may be derived. The intermediate transitions may be denoted by $Tr_j$, and the frontiers may be denoted by $X_j$, where j ∈1 . . . l.

For the example regular expression (a*)aa, the start states $S_1$={1}, and the accept states $F_1$={3}. If the $k^{th}$ row of transition table Tr (shown in FIG. 5B) is denoted by Tr[k], then Tr can be considered as a union of all transitions, i.e., Tr={Tr[1]; Tr[2]; Tr[3]}. With input string aaaa, it can be determined that $Tr_1$={Tr[1]; Tr[2]}, $X_1$={1; 2}; $Tr_2$={Tr[1]; Tr[2]; Tr[3]}, $X_2$={1; 2; 3}; $Tr_3$={Tr[1]; Tr[2]; Tr[3]}, $X_3$={1; 2; 3}; $Tr_4$={T[1]; Tr[2]; Tr[3]}, $X_4${1; 2; 3}.

When the final input symbol is reached, the comparison module 104 may determine if any state in $X_l$ belongs to $F_1$. If so, the input string $a_0 a_1 \ldots a_l$ is accepted by $A_1$, which means the input string matches the regular expression defined by $A_1$. In the above example, $X_4$={1; 2; 3} contains an accept state 3, thus, aaaa is accepted by (a*)aa.

In case an input string $a_0 a_1 \ldots a_l$ is accepted by $A_1$ and the regular expression has capturing groups, the extraction module 105 may extract substrings specified by the capturing groups. To do so, a backward path is determined from an accept state to a start state of the automaton. Any backward path from an accept state to a start state generates a valid set of submatch instances.

In order to determine a backward path, the extraction module 105 may find a previous state given a current state with an input symbol. Starting from the last input symbol $a_l$ and one of the accept states $q_f$∈$F_1$ (such that the input string is accepted at $q_f$), a previous state $q_l$ which led the automaton to state $q_f$ with input symbol $a_l$ can be obtained by checking the intermediate transitions $Tr_l$ generated during the match test. In particular, $q_l$ is any state in $Q_l$, where $Q_l$={x|(x, $a_l$, $q_f$, t) ∈$Tr_l$}. Suppose ($q_l$, $a_l$, $q_f$, t) is a transition in $Tr_l$ that led state $q_l$ to $q_f$ with input symbol $a_l$, then the submatch tags associated with symbol $a_l$ is t. It is noted that t can be empty if there is no capturing group associated with a transition. Using $q_l$ as a current state, with input symbol $a_{l-1}$, a previous state which led the automaton to $q_l$ with input symbol $a_{l-1}$ can be obtained by looking up the intermediate transitions in $Tr_{l-1}$. The submatch tags associated with $a_{l-1}$ can be found using the same approach as for $a_l$. This backward process may be continued to find previous states and submatch tags until $a_0$ is reached. Finally, a backward path from $q_f$ to a start state and submatch tags associated with each input symbol may be obtained.

In the above example, a backward path from an accept state 3 to a start state 1 with input string aaaa is shown in FIG. 6. Referring to FIG. 6, it can be seen that the first two symbols are associated with submatch tag $t_1$, and all other symbols have no output tag. Submatch Extraction can be achieved by scanning the input string and collecting symbols with the same submatch tags. In the foregoing example, only the first two symbols of aaaa are associated with tag $t_1$. Thus, the submatch of (a*)aa for input string aaaa is aa.

The above match test and backward path finding can be accomplished using OBDDs, which can have higher time efficiency than a table look-up approach. It is noted that the OBDDs may be constructed prior to determination of the backward path.

In order to construct the OBDDs by the OBDD creation module 103, generally an NFA may be represented and operated symbolically using Boolean functions. Boolean functions may be used to update the frontiers during the match test discussed above. OBDDs may be used to represent and manipulate the Boolean functions such that tags corresponding to the capturing groups are properly set.

In order to represent and operate NFA $A_1 = (Q_1, \Sigma, T, \delta_1, \Gamma_1, S_1, F_1)$ with Boolean functions, the OBDD creation module 103 uses NFAs in which $\in$ transitions have been eliminated. The Boolean functions of an NFA use four vectors of Boolean variables, x, y, i, and t. Vectors x and y are used to denote states in $Q_1$, and they contain $[\log|Q_1|]$ Boolean variables each. Vector i denotes symbols in $\Sigma$, and thus contains $[\log|\Sigma|]$ Boolean variables. Vector t denotes the submatch tags and contains $[\log|T|]$ Boolean variables. The following Boolean functions for NFA $A_1 = (Q_1, \Sigma, T, \delta_1, \Gamma_1, S_1, F_1)$ may be constructed.

$\Delta(x, i, y, t)$ denotes the transition table of $A_1$. It is a disjunction of all transition relations (x, i, y, t) of an NFA. The transition table of the example regular expression of FIG. 5B can be expressed by the Boolean function shown in FIG. 7, where a state may be represented by two Boolean variables, an input symbol by one Boolean variable, and a submatch tag by one Boolean variable. In particular, states 1, 2, and 3 are encoded in binary by 01, 10, and 11; symbol a is encoded by 1; and tag $t_1$ is encoded by 1, and no tag is encoded by 0. The fifth column of the table of FIG. 7 shows the function value for each set of Boolean variables. The function value for any transition is 1. The table for FIG. 7 lists Boolean variable combinations corresponding to the three transitions for the table for FIG. 5B. The function values for the Boolean variable combinations not listed in the table for FIG. 7 are 0 (note: there are 29 other combinations for the other possible values of x, i, y, and t.

$I_{94}(i)$ stands for the Boolean representation of symbols in $\Sigma$. In the foregoing example, $I_a = i$. A symbol different than a is represented by $\bar{i}$.

F(x) is a Boolean representation of a set of frontier states. For example, after consuming the first input symbol of aaaa, the frontier of the NFA is {1,2}, and the Boolean representation is $F(x) = \bar{x}_1 x_2 \lor x_1 \bar{x}_2$.

$\Delta_F(x, i, y, t)$ denotes the Boolean representation of a set of intermediate transitions of an NFA, from which the new frontier states and the output tags are derived.

A(x) is used to define the Boolean representation of a set of accept states of an NFA. In the example NFA shown in the table of FIG. 5B, the set of accept states is {3}, thus, $A(x) = x_1 x_2$.

The Boolean functions described above can be computed automatically from the extended transition table of FIG. 5B of an NFA. The start set of states, which is the initial frontier, can also be represented as a Boolean function.

For the submatch extraction performed by the extraction module 105, suppose that the frontier of an NFA is F(x) at some instant of operation, and the next symbol in the input string is σ, then the new frontier states can be computed by the following Boolean operations:

$$g(y) = \exists x \exists i \exists t [\Delta_F(x, i, y, t)] \quad \text{Equation (1)}$$

For Equation (1) $\Delta_F(x, i, y, t) = F(x) \land I_\sigma(i) \land \Delta(x, i, y, t)$.

In order to understand why g(y) represents the new frontier states, consider the truth table of Boolean function $\Delta(x, i, y, t)$. By construction, this function evaluates to 1 only for x, i, y, and t for which (x, i, y, t) is a transition of the NFA. Function F(x) evaluates to 1 only for values of x that denote the states in the current frontier of the NFA. Thus, the conjunction of $\Delta(x, i, y, t)$ with F(x) and $I_\sigma(i)$ only selects the rows of the truth table $\Delta(x, i, y, t)$ that correspond to transitions from states in the frontier labeled with symbol a, resulting in intermediate transitions $\Delta_F(x, i, y, t)$, which will be used in submatch extraction. $\Delta_F$ is a function of x, i, y, and t. The new frontier states are only associated with y, (i.e., the target states of transitions) for which the conjunction has a satisfying assignment. To find the new frontier states, x, i, and t may be existentially quantified, resulting in g(y). To express the new frontier states in terms of x, variables in y may be renamed to the corresponding ones in x.

To check whether the automaton is in an accept state, the satisfiability of conjunction between the frontier F(x) and the accept set of states A(x) is checked.

In case an input string is accepted by the automaton based on a determination by the comparison module 104 and the regular expression has capturing groups, as discussed above, the extraction module 105 may use OBDDs to find a backward path from an accept state to a start state of the automaton. The backward path finding may start from an accept state and the last symbol of the input string. The current state of a backward path may be denoted reverse frontier, which contains only one state, since one path is needed. Suppose at an instant of the path finding the reverse frontier is $F_r(y)$, and the previous input symbol is $I_\sigma$ the previous state which led the automaton to state $F_r(y)$ with input symbol $I_\sigma$ can be determined by the following Boolean function:

$$\Delta_r(x, i, y, t) = F_r(y) \land I_{94}(i) \land \Delta_F(x, i, y, t) \quad \text{Equation (2)}$$

For Equation (2), $\Delta_F(x, i, y, t)$ are the intermediate transitions corresponding to input symbol $I_\sigma$ during the match test process. The conjunctions in Equation (2) select transitions (labeled by σ) from $\Delta_F(x, i, y, t)$ where the target state is $F_r(y)$. The previous states are associated with x in $\Delta_r(x, i, y, t)$. Since one path is needed, one row may be chosen in the truth table of $\Delta_r(x, i, y, t)$ to find one previous state of $F_r(y)$. If the chosen row is denoted as PICKONE($\Delta_r(x, i, y, t)$), a previous state g(x) of $F_r(y)$ can be derived by:

$$g(x) = \exists y \exists i \exists t [H(x, i, y, t)] \quad \text{Equation (3)}$$

$$H(x, i, y, t) = \text{PICKONE}(\Delta_r(x, i, y, t)) \quad \text{Equation (4)}$$

To obtain submatch tags τ(t) associated with σ, x, i, and y are existentially quantified on H(x, i, y, t) as follows:

$$\tau(t) = \exists x \exists i \exists y \cdot H(x, i, y, t) \quad \text{Equation (5)}$$

Based on the discussion above, the OBDD creation module 103 represents NFAs by Boolean functions and manipulates the Boolean functions using OBDDs. An OBDD for an NFA $A_1=(Q_1, \Sigma, T, \delta_1, \Gamma_1, S_1, F_1)$ is a 5-tuple [{OBDD($\Delta$(x, i, y, t))}, {OBDD($I_o|\forall \sigma \in \Sigma$)}, {OBDD($\tau_t|t \in T$)}, {OBDD($F_{S_1}$)}, {OBDD(A)}], where $\Delta$(x, i, y, t), $I_o$, and A are defined as discussed above, $\tau_t$ is the Boolean representation of a tag $t \in T$, and $F_{S_1}$ is the Boolean representation of start states. For example, FIG. 2 is an OBDD representation of the Boolean function $\Delta$(x, i, y, t) in FIG. 7, where x={$x_1, x_2$}, i={$x_3$}, y={$x_4, x_5$}, and t={$x_6$}.

As discussed above, by using OBDDs for submatch extraction, the time efficiency of submatch extraction is improved. For example, considering the operation of an NFA, to derive a new set of frontier states, the transition table is retrieved for each state in the current set of frontier states, leading to O($|\delta| \times |F|$) operations per input symbol. The complexity of OBDD on deriving a new frontier set can be completed by two conjunctions, followed by existential quantifications. The time-efficiency may be based on the conjunction, which is O(sizeof (OBDD($\Delta$))×sizeof (OBDD($I_o$))×sizeof(OBDD(F))). Because OBDDs are compact representations of frontier F and transition table $\Delta$, the time efficiency of submatch extraction is increased. The performance of OBDDs based on NFAs is pronounced when the transition table of an NFA is sparse and the frontier set is large, for which OBDDs can effectively remove the redundancy of transition relations $\delta_1$ and frontier set F of the automaton.

Using OBDDs for submatch extraction also provides for retention of space-efficiency. For example, the space cost of an OBDD based on an NFA is based on $\Delta$(x, i, y, t), which uses a total of $2 \times \lceil \log|Q_1| \rceil + \lceil \log|\Sigma| \rceil + \lceil \log|T| \rceil$ Boolean variables. The space consumption of this OBDD is $O(|Q_1|^2|\Sigma| \times |T|)$, which is similar to the space consumption of the transition table of an NFA.

Figure 8:
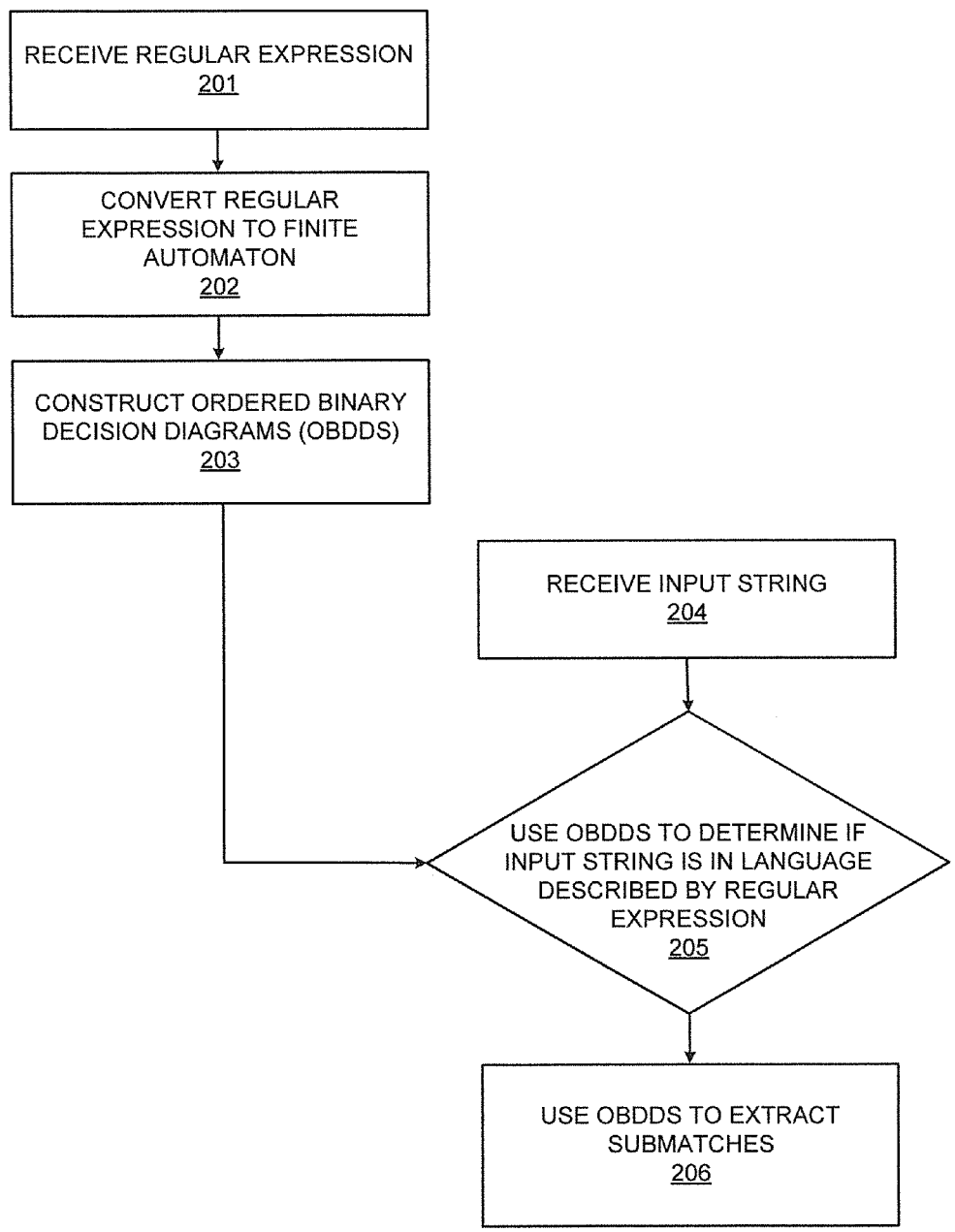
FIG. 8 illustrates a method for submatch extraction, according to an example of the present disclosure.

FIG. 8 illustrates a flowchart of a method 200 for submatch extraction, corresponding to the example of the submatch extraction system 100, whose construction is described in detail above. The method 200 may be implemented on the submatch extraction system with reference to FIGS. 1-7 by way of example and not limitation. The method 200 may be practiced in other systems.

Referring to FIG. 8, at block 201, a regular expression is received. For example, referring to FIG. 1, the input module 101 may receive a regular expression.

At block 202, the regular expression with capturing groups is converted into an automaton to extract submatches. More specifically, the regular expression is converted into a finite automaton with tags representing the capturing groups. For example, referring to FIG. 1, the regular expression may be used to create an automaton by the automaton creation module 102.

At block 203, the finite automaton is converted into OBDDs. For example, referring to FIG. 1, the OBDD creation module 103 may use the automaton to construct the OBDD representations thereof.

At block 204, an input string is received. For example, referring to FIG. 1, the comparison module 104 may receive input strings.

At block 205, the constructed OBDDs are used to determine whether the input string is in a language described by the regular expression. For example, referring to FIG. 1, the comparison module 104 may match the input strings to the regular expression. The input string is processed by the OBDDs, one character at a time, to output tags representing the capturing groups during processing of each character. If an input string does not match the regular expression, submatches are not extracted.

At block 206, if an input string matches the regular expression, the OBDDs created by the OBDD creation module 103 may be used to extract submatches. Specifically, the tags and the input string are processed in reverse order by the OBDDs, one character at a time, to extract the submatches. For example, referring to FIG. 1, the extraction module 105 may used the OBDDs created by the OBDD creation module 103 to extract submatches.

Figure 9:
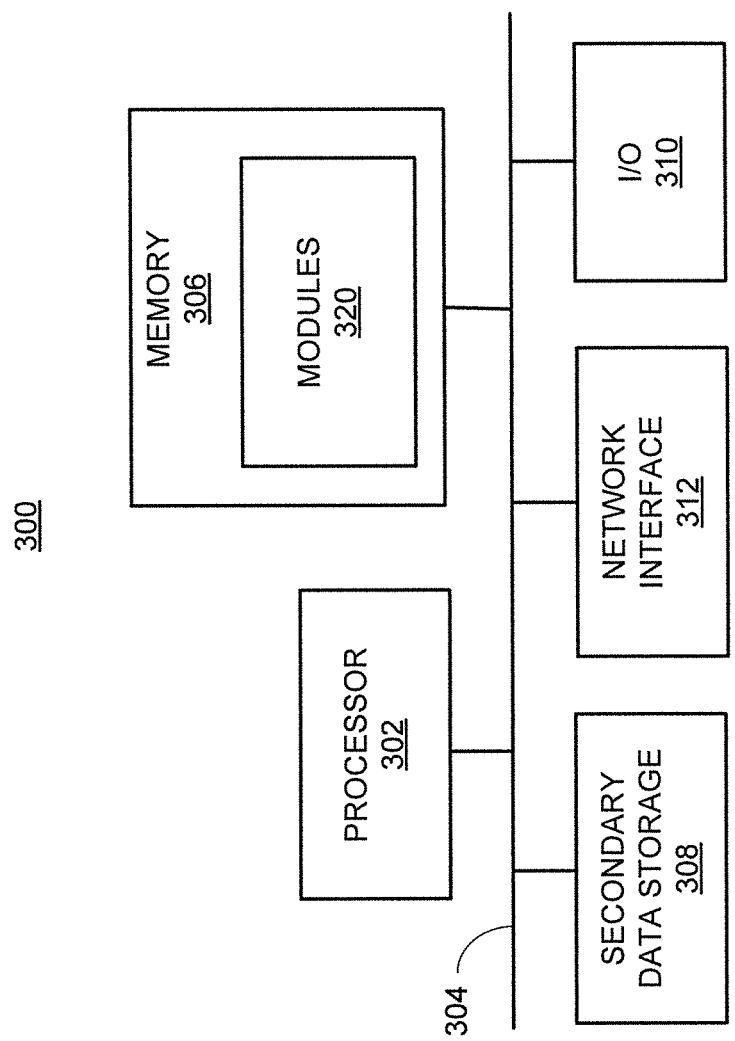
FIG. 9 illustrates a computer system, according to an example of the present disclosure.

FIG. 9 shows a computer system 300 that may be used with the examples described herein. The computer system 300 represents a generic platform that includes components that may be in a server or another computer system. The computer system 300 may be used as a platform for the system 100. The computer system 300 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 includes a processor 302 that may implement or execute machine readable instructions performing some or all of the methods, functions and other processes described herein. Commands and data from the processor 302 are communicated over a communication bus 304. The computer system 300 also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include modules 320 including machine readable instructions residing in the memory 306 during runtime and executed by the processor 302. The modules 320 may include the modules 101-105 of the system 100 shown in FIG. 1.

The computer system 300 may include an I/O device 310, such as a keyboard, a mouse, a display, etc. The computer system 300 may include a network interface 312 for connecting to a network. Other known electronic components may be added or substituted in the computer system 300.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for submatch extraction, the method comprising:
   receiving an input string;
   receiving a regular expression;
   converting, by a processor, the regular expression including a capturing group into an ordered binary decision diagram (OBDD);
   processing the input string by the OBDD, one input string character at a time, wherein processing of an individual input string character comprises outputting a tag representing a capturing group that corresponds to the individual input string character;

determining that the regular expression matches the input string; and in response to a determination that the regular expression matches the input string, extracting a submatch based on the OBDD by processing the tag and the input string in reverse order by the OBDD, one input string character at a time, wherein the submatch corresponds to a substring of the input string, and the substring corresponds to the capturing group.

2. The method of claim 1, wherein converting the regular expression including the capturing group into the OBDD comprises:

converting the regular expression into a finite automaton with the tag representing the capturing group; and converting the finite automaton into the OBDD.

3. The method of claim 1, wherein the OBDD implements a plurality of regular expressions.

4. The method of claim 1, wherein receiving the input string, receiving the regular expression and converting the regular expression are implemented at a parser.

5. The method of claim 1, wherein receiving the input string, receiving the regular expression and converting the regular expression are implemented at a security information and event management (SIEM) system.

6. The method of claim 1, wherein receiving the input string, receiving the regular expression and converting the regular expression are implemented at an intrusion detection system (IDS).

7. The method of claim 1, further comprising:

converting the regular expression into a finite automaton;

using a Boolean function to represent a transition of the finite automaton; and extracting the submatch by manipulating the Boolean function using the OBDD.

8. A submatch extraction system comprising:

a memory comprising machine readable instructions to:
receive an input string;
receive a regular expression;
convert the regular expression into a finite automaton;
use a Boolean function to represent a transition of the finite automaton;
convert the regular expression including a capturing group into an ordered binary decision diagram (OBDD), wherein the capturing group corresponds to a substring of the input string, and the substring corresponds to a submatch;
process the input string by the OBDD, one input string character at a time, wherein processing of an individual input string character comprises outputting a tag representing a capturing group that corresponds to the individual input string character;
determine if the regular expression matches the input string; and
in response to a determination that the regular expression matches the input string, extract the submatch based on manipulation of the Boolean function using the OBDD by processing the tag and the input string in reverse order by the OBDD, one input string character at a time; and a processor to implement the machine readable instructions.

9. The submatch extraction system of claim 8, wherein the machine readable instructions are to:

convert the regular expression into the finite automaton with the tag representing the capturing group; and convert the finite automaton into the OBDD.

10. The submatch extraction system of claim 8, wherein the machine readable instructions are to:

use the OBDD to implement a plurality of regular expressions.

11. A non-transitory computer readable medium having stored thereon machine readable instructions for submatch extraction, the machine readable instructions when executed cause a computer system to:

receive an input string;

receive a regular expression;

convert, by a processor, the regular expression including a capturing group into an ordered binary decision diagram (OBDD);

process the input string by the OBDD, one input string character at a time, wherein processing of an individual input string character comprises outputting a tag representing a capturing group that corresponds to the individual input string character;

determine if the regular expression matches the input string; and in response to a determination that the regular expression matches the input string, extract the submatch by processing the tag and the input string in reverse order by the OBDD, one input string character at a time.

12. The non-transitory computer readable medium of claim 11, wherein the machine readable instructions when executed cause the computer system to:

convert the regular expression into a finite automaton with the tag representing the capturing group; and convert the finite automaton into the OBDD.

13. The non-transitory computer readable medium of claim 11, wherein the machine readable instructions when executed cause the computer system to:

use the OBDD to implement a plurality of regular expressions.

14. The non-transitory computer readable medium of claim 11, wherein the machine readable instructions when executed cause the computer system to:

convert the regular expression into a finite automaton;

use a Boolean function to represent a transition of the finite automaton; and extract the submatch by manipulating the Boolean function using the OBDD.

* * * * *